United States Patent [19]

Van 'T Veen et al.

[11] Patent Number: 4,981,590
[45] Date of Patent: Jan. 1, 1991

[54] COMPOSITE CERAMIC MICROPERMEABLE MEMBRANE, PROCESS AND APPARATUS FOR PRODUCING SUCH MEMBRANE

[75] Inventors: Willem H. Van 'T Veen, Alkmaar; Albertus J. G. Engel, Heiloo; Benedictus C. Bonekamp, Schagen; Hubertus J. Veringa, Zwaag; Rinse A. Terpstra, Schagen, all of Netherlands

[73] Assignee: Hoogovens Groep BV, Netherlands

[21] Appl. No.: 271,667

[22] Filed: Nov. 16, 1988

[30] Foreign Application Priority Data

Nov. 19, 1987 [NL] Netherlands ................. 8702759

[51] Int. Cl.$^5$ ............................................. B01D 69/12
[52] U.S. Cl. ........................ 210/490; 210/500.25; 210/500.26
[58] Field of Search ............ 210/500.25, 500.26, 210/490, 510.1, 496

[56] References Cited

U.S. PATENT DOCUMENTS

| 4,042,359 | 8/1977 | Schnabel et al. ............... 65/2 |
| 4,077,885 | 3/1978 | Van Heuven et al. ..... 210/500.26 X |
| 4,423,700 | 1/1984 | Nguyen et al. ................ 118/404 |
| 4,689,150 | 8/1987 | Abe et al. ............... 210/500.26 X |

FOREIGN PATENT DOCUMENTS

| 0040282 | 11/1981 | European Pat. Off. . |
| 0075962 | 4/1983 | European Pat. Off. . |
| 0092840 | 11/1983 | European Pat. Off. . |
| 0136937 | 4/1985 | European Pat. Off. . |
| 0144097 | 6/1985 | European Pat. Off. . |
| 0184926 | 6/1986 | European Pat. Off. . |
| 0188950 | 7/1986 | European Pat. Off. . |
| 0242208 | 10/1987 | European Pat. Off. . |
| 1506402 | 11/1967 | France . |
| 1531810 | 5/1968 | France . |
| 2150390 | 4/1973 | France . |
| 2230601 | 12/1974 | France . |
| 2336360 | 7/1977 | France . |
| 2359804 | 2/1978 | France . |
| 2418007 | 9/1979 | France . |
| 2502508 | 10/1982 | France . |
| 2527092 | 11/1983 | France . |
| 2580517 | 10/1986 | France . |
| 6274409 | 9/1987 | Japan . |

OTHER PUBLICATIONS

European Search Report, Appln. No. EP 88 20 2577, search completed 24-02-1989 at The Hague.

Primary Examiner—Frank Spear
Attorney, Agent, or Firm—Stevens, Davis, Miller & Mosher

[57] ABSTRACT

A microporous ceramic membrane comprising a porous support and a microporous layer firmly bound to each other, with a sharp geometric transition between the support and the microporous layer, the microporous layer being free of pin-holes. The microporous membrane has a predetermined average pore diameter and it is suitable for microfiltration. The membrane can comprise further microporous layers making it suitable for ultrafiltration and hyperfiltration. The membrane can be prepared by suspension coating of a support, whereby the support and/or the suspension are pretreated in order to lower temporarily the affinity between the support and the suspension.

6 Claims, 4 Drawing Sheets

COMPOSITE CERAMIC MICROPERMEABLE MEMBRANE, PROCESS AND APPARATUS FOR PRODUCING SUCH MEMBRANE

FIELD OF THE INVENTION

The present invention relates to a microporous membrane comprising a porous ceramic support and a microporous inorganic layer. In particular, the present invention relates to an inorganic composite membrane suitable for separation and filtration of a discontinuous phase in the microfiltration range, i.e. particles in the size range of about 20 nm to about 1 $\mu$m. Herein, "particles" do not only refer to solids but also to liquids (emulsion particles) or other minority components of multi-phase systems. Inorganic membranes have considerable advantages over organic membranes, in that they are both chemically and thermally more resistant.

For most purposes, a microfiltration membrane should have both high permeability and structural strength. These requirements can in practice only be met by a composite membrane, wherein a macroporous support provides the necessary strength and a thin microporous layer, overlying the support, provides the microfiltration function. Such composite membranes can be produced by coating a porous support with a microporous layer formed out of a suspension and subsequent heating the composite.

Macroporous ceramic materials suitable as a microfiltration support normally exhibit structural irregularities which prevent the formation of a uniform, high performance microfilter. Coating such a support with the microporous layer forming suspension results in partly filling cavities in the support with microporous material and in the subsequent formation of cracks and pin-holes (apertures of the order of 10 to 100 $\mu$m) in the microporous layer, by which unsatisfactory filtering properties are obtained.

BACKGROUND OF THE INVENTION

EP-A-242,208 describes a composite membrane for ultrafiltration purposes comprising a porous inorganic support which must meet special requirements in that the surface has a particular pore diameter, and is preferably of anodic aluminium oxide. These requirements make the membrane too expensive for most uses.

In EP-A-136,937, a process of producing a microporous membrane is proposed, wherein a metal oxide or metal hydroxide sol, obtained by hydrolysis of a metal compound, is thickened and acidified and subsequently applied on a supporting layer, followed by drying and eliminating the thickening agent, and sintering. Although this process is said to prevent the formation of cracks, the complexity of the process is a serious drawback; furthermore, the permeability of the membrane is undesirably low.

EP-A-40,282 describes a process of producing an ultrafiltration membrane by coating a porous support, whereby the porous support is treated with a volatile liquid such as acetone or methanol, which liquid serves to draw the coating material into the pores of the support.

For the same purpose, it is known to saturate the porous support with water prior to applying the microporous layer forming suspension.

According to EP-A-144,097, the penetration of microporous layer forming particles into the support is prevented by reducing the contact time between the microporous layer forming suspension and the support.

However, the membranes obtained by these known processes are not free from pin-holes, if the support contains pores of more than about 5 $\mu$m. Also, the permeability of the membranes is insufficient.

OBJECTS OF THE INVENTION

Thus, it is an object of the present invention to provide a composite ceramic membrane for microfiltration purposes, having a thin, uniform microporous layer of the desired pore size, without pin-holes, cracks or other irregularities which damage the performance of the microfiltration membrane.

An object of the invention is also to provide a ceramic microporous membrane at relatively low cost, which membrane must meet strict requirements as to permeabilities, filtering ranges and structural and chemical integrity.

Another object of the invention is to provide a microfiltration, ultrafiltration or hyperfiltration membrane of inorganic, composite materials, which does not have the drawbacks of the membranes of the prior art.

Another object of the invention is to provide a process of producing a composite microporous membrane. Another object of the invention is to provide an apparatus for applying a coating suspension onto a tubular porous support.

SUMMARY OF THE INVENTION

The invention has the following features:

the microporous layer is firmly bound to the geometric outer surface of the porous support, making the membrane structurally stable and suitable for multiple regeneration by applying high back flush pressures, if necessary;

the microstructural transition between the porous support and the microporous layer is very sharp, the packing of the particles being such that the support material and the microporous layer material do not interfere with each other's permeabilities;

the microporous layer is thin and has a smooth outer surface, resulting in a high and uniform permeability;

the microporous layer has a predetermined average pore diameter, depending on the intended use, and it has a narrow pore diameter distribution; in particular, the diameter distribution is sharply confined with respect to larger pore diameters than the average, for example, 99% of the pore volume consists of pores with a diameter of less than 1:15 times the average diameter, and 99.9% of the pore volume consists of pores with a diameter of less than 1.2 times the average diameter;

the microporous layer is free of pin-holes and other structural irregularities which would seriously impair the separation performances of the membrane;

the inner face of the microporous layer closely follows the surface of the porous support in such a way that pores in the support having an even greater diameter than the thickness of the microporous layer are spanned by the microporous layer;

the membrane has a high permeability.

The thickness of the microporous layer can be chosen according to the intended use of the membrane. It is typically between 10 and 100/$\mu$m and preferably between 15 and 30 $\mu$m. The average pore size of the microporous layer can have any value in the microfiltration range i.e. about 20 nm to 1 $\mu$m. It is preferably between 100 and 500 nm; The microporous layer consists preferably of at least one metal oxide such as aluminium oxide, titanium oxide, zirconium oxide, yttrium oxide, silicon oxide etc. More preferably it consists essentially of aluminium oxide.

The porous support can have any thickness, e.g. between 500 $\mu$m and 1 cm and more, provided that it has sufficient structural strength. It can have pore sizes between 0.1 $\mu$m and 50 $\mu$m or even greater.

The porous support can be of any ceramic material such as oxides of aluminium, silicon, titanium and other metals, and mixtures thereof, possibly together with oxides of other elements such as alkali, alkaline earth, and earth metals etc.; other materials such as metals, glass, carbon can also be used as a support. In a preferred embodiment, the porous support consists mainly of sintered alpha alumina.

DETAILED DESCRIPTION OF THE INVENTION

Figure 1:
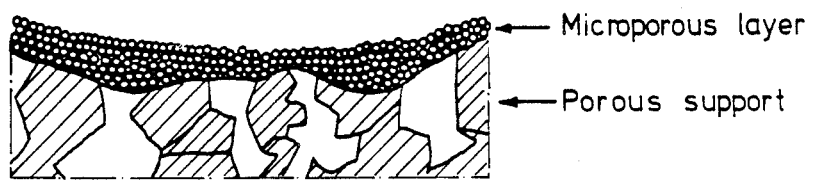
FIG. 1 schematically shows a cross-section of a typical membrane of the invention.

The membrane of the invention can have any shape such as a tube, plate, cup, funnel etc., and size, which are suitable for the intended separation process.

The present invention also relates to a microporous membrane consisting of a composite membrane as described hereabove and one or more subsequent microporous layers bound to the first microporous layer, at least one and preferably each subsequent layer having a lower average pore diameter than the preceding layer. Such three-layer or multilayer membranes are especially useful, when the desired pore size cannot satisfactorily be achieved with a two component membrane, for example when the desired pore size is below 20 nm. Because of the smooth surface of the microfiltration layer, the second and possible further layers can be very thin, e.g. 1 $\mu$m–10 $\mu$m, and have pores in the range of 0.5–100 nm, in particular 0.5–20 nm, thus providing a microfiltration, or, especially, an ultrafiltration or hyperfiltration membrane having a sharp filtration range and relatively high permeability.

The present invention also relates to a process for producing a microporous membrane, such as the microfiltration membrane referred to above, wherein a porous ceramic support is coated with a microporous layer forming suspension and the coated support is heated.

The process is characterized in that, before coating the support, the affinity between the porous support and the microporous layer forming suspension is lowered such that penetration of the suspension into the internal structure of the porous support is substantially prevented, while wetting of the surface of the porous support during coating is not prevented.

In the process of the invention, the suspended particles of the microporous layer forming suspension can not easily enter cavities situated in the porous support, which would otherwise result in the formation of pin-holes and cracks in the microporous layer upon drying the membrane. Pore sizes up to 50 $\mu$m of the porous support do not result in such pin-holes, when the process of the invention is used. This means that relatively low grade, and therefore inexpensive, materials can be used in the present process to produce a microfiltration membrane with excellent separation characteristics.

The affinity between the porous support and the coating suspension can be measured for example by means of the contact angle, i.e. the internal angle of the edge between droplets of the suspension and the geometric support surface. On measuring the contact angle, the dimensions of the droplets should be significantly greater than the surface pore diameter. A small angle, down to 0°, corresponds to perfect wetting, whereas a large angle, up to 180° corresponds to non wetting. For example the contact angle between a ceramic support and an aqueous suspension is normally between 30°–60°. In the process of the invention, the affinity between the support and the suspension is lowered such that the contact angle is greater than 60°, preferably between 75° and 135° and more preferably between 90° and 120°.

The affinity between the support and the suspension can be altered by altering the hydrophilicity of the support and/or the suspension. Preferably, the affinity is lowered by lowering the hydrophilicity of the porous support, in other words, by making the support more hydrophobic. This can be done, e.g. by converting hydroxy groups and oxy groups on the surface of the ceramic support into less hydrophilic groups such as esters, ethers and the like. Lowering of the affinity of the support for the coating suspension does not affect the adherence of the microporous layer to the support after drying.

In a preferred embodiment, the porous support is made more hydrophobic by treating it with a silane composition, i.e. an undiluted or, preferably, diluted silane compound. Such a silane compound contains relatively hydrophobic groups, such as alkyl groups, substituted alkyl groups, alkenyl groups, phenyl groups, alkoxy groups, acyloxy groups, etc. It also contains groups, such as hydroxy groups, alkoxy groups, halogens etc., which can react, directly or indirectly, with reactive groups present on the support surface. Silanes which are very useful in the process of the invention are trialkoxy-alkylsilanes, for example trimethoxymethylsilane, dialkoxy-phenyl-alkylsilanes, triacyloxy-alkylsilanes or trialkoxy substituted alkyl-, such as hydroxyalkyl- or aminoalkyl-silanes and the like. An alkoxy group can react with hydroxy groups present on the support surface, directly, or after hydrolysis to a hydroxy group, thus lowering the hydrophilicity of the support surface.

The degree of lowering of the hydrophilicity can be controlled by varying the amount and/or the concentration of the silane composition with which the support is treated, and by the treatment length and temperature. Preferably, the duration of the treatment is long enough to allow the silane composition to penetrate the pores of the porous support.

Advantageously, the silane composition contains a solvent which can be easily removed after the treatment. Examples of suitable solvents are lower ketones, such as acetone, methylethyl ketone, etc., lower alcohols, such as methanol, ethanol, etc., and lower ethers, such as diethyl ether, tetrahydrofuran, dioxane, etc. The solvent can be removed by evaporation at ambient or elevated temperature, for example between 15° C. and 105° C., depending on the particular solvent.

The concentration of the silane solution is not limiting, 0.1–10% is a useful concentration range; preferably, the concentration is between 0.5 and 5% by weight.

Silane compositions are often referred to as "silane primers" or "silane coupling agents". Such compositions can be used in the present process.

Silanes suitable for use in the process of the invention are commercially available, for example, Dow Corning ® Z-6020, Z-6030 and Z-6070, or Silane $PC_{12}$ from Permacol B.V.. The silane composition may contain other ingredients such as cosolvents, stabilisers, hydrolysis catalysts etc..

In order to accelerate the hydrophilicity lowering process and to adjust the desired hydrophilicity, it has been found to be of advantage to expose the silane treated support to small amounts of water. This can be done by evaporating the solvent in the presence of moist air, or by using a solvent, such as a ketone, which contains a small amount of water. Depending on the amount of water present and on the desired hydrophilicity, the preferred time interval between the silane pretreatment and the coating with the microporous layer forming suspension, can be chosen, for example from 30 to 60 minutes.

Preferably, the treatment with the silane composition results in a monolayer of silicon containing groups. For example, infrared analysis shows that, after treatment with trimethoxy-methylsilane, hydroxy-methoxy-methylsilyloxy groups are present on the support. Assuming a mean surface area per silyl group of 1 $nm^2$, 10 mg of trimethoxymethylsilane produces a monolayer of about 40 $m^2$. This means that 1 liter of a 1% silane solution is sufficient for pretreating a support having an effective surface area of 40 $m^2$.

The treatment with a silane composition can be effected by simply immersing the support in the silane composition, or by spraying, rinsing, brushing or any other convenient method. Preferably, immersion is carried out slowly enough to allow the silane composition to be absorbed in the pores of the support.

The treatment with the silane composition results into a more hydrophobic internal surface of the porous support. Thus, upon coating the pretreated support, large pores of the support are spanned by the microporous layer rather than filled up with microporous suspension particles.

However, the outer surface of the support should still have sufficient affinity for the coating suspension, in order to create a strong bond between the porous support and the microporous layer. This can be effected by adjusting the hydrophilicity of either of the components.

In the heating step after the pretreated support is coated with the microporous layer forming suspension, the silane groups are partially evaporated, and partially converted into silicon dioxide. According to X-ray analysis, the residue after heating is amorphous; the $SiO_2$ content appeared to be 98%.

The microporous layer forming suspension to be used in the process of the invention is preferably an aqueous suspension of a metal oxide or hydroxide or of a precursor thereof, such as a metal alkoxide. Suitable metals for said metal oxides, hydroxides and alkoxides are group III, IV, V, VI, VII and VIII metals, such as aluminium, titanium, zirconium, yttrium, silicon, manganese etc.

Aluminium oxide appears to be particularly useful, in that it is relatively inexpensive and can be supplied in various grades and sizes. The particle size can be chosen according to the desired pore size of the microporous membrane. In general, particle sizes between for example 10 nm and 1 $\mu$m are suitable.

Instead of lowering the affinity between the support and the suspension by lowering the hydrophilicity of the support, the affinity can be lowered by lowering the hydrophilicity of the aqueous suspension, e.g. by making it less polar.

If the affinity has been adjusted by silane treatment, as described above, a further adjustment in affinity can be made by adding a detergent to the aqueous suspension, making the affinity between the support and the suspension higher again, inducing an attractive interaction between the porous support and the microporous layer, while at the same time the pores of the support are not penetrated excessively with suspended particles.

The microporous layer forming suspension can be applied by immersing the support in the suspension, or by spraying or other conventional methods. According to the invention, the suspension is preferably applied by immersion.

Figure 2:
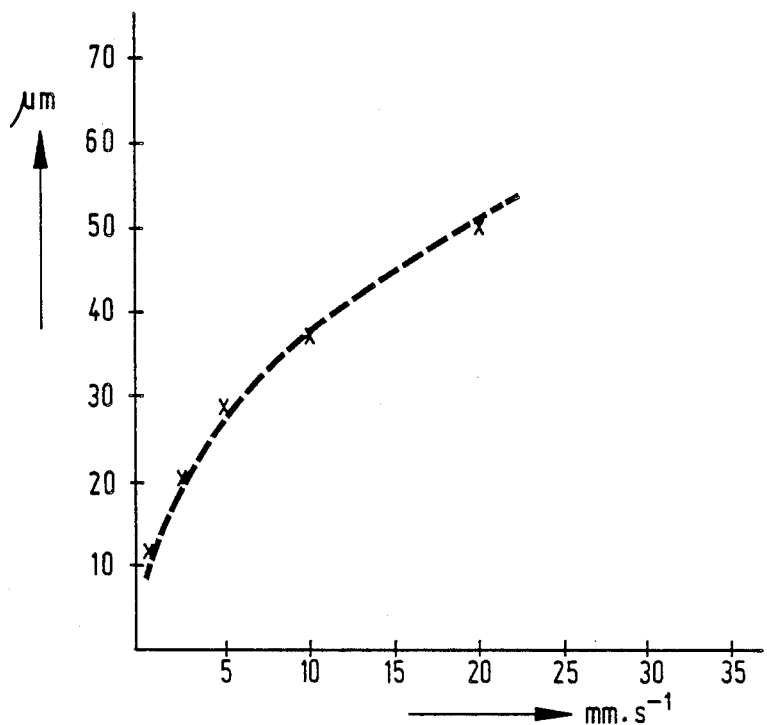
FIG. 2 is a graph illustrating the relationship between the withdrawal rate and the coating thickness.

The thickness of the microporous layer can conveniently be controlled by varying the speed of withdrawing the immersed porous support from the coating suspension. For example, a support immersed in a 37.5% by weight $Al_2O_3$ suspension is coated with a microporous layer of 20 $\mu$m after drying, when it is removed at a rate of 2.5 mm/s, whereas a microporous layer of 50 $\mu$m after drying results when the rate of removal from the coating suspension is 20 mm/s. The relationship between the withdrawal rate and the coating thickness is graphically illustrated in FIG. 2, wherein the abscissa represents the withdrawal rate and the ordinate represents the thickness of the microporous layer after drying.

In contrast, the duration of contact between the porous support and the coating suspension has little effect on the thickness of the microporous layer.

The thickness of the microporous layer can be increased, if desired, by carrying out two or more coating steps, with intermittent partial or complete drying.

It can be of advantage to carry out two or more coating steps, with suspensions having decreasing particle sizes. In this way, a microporous membrane with smaller pore size, for example in the ultrafiltration or even hyperfiltration range, is obtained. Such a second and further microporous layer with reduced pore size can conveniently be applied using a sol-gel process, for example as described in EP-A-144,097.

The pore size, the porosity and the permeability of the microporous layer can be adjusted by varying the sintering temperature of the coated membrane, and by varying the particle size and the type of suspended particles.

Typically, the pore size of a two component microfiltration membrane can be selected between 20 nm and 1 $\mu$m, the porosity can be between 30 and 70% and the liquid permeability is between 100 and 20,000 1 /h.$m^2$.bar.

The invention also relates to an apparatus for coating a tubular support with a coating suspension, wherein the support can be removed from the suspension or vice versa at a determined rate. Such an apparatus can also be used for applying a second and further layer by a sol-gel process.

The apparatus of the invention comprises a collar fitting into or around a tubular substrate, and means for axially moving the tubular substrate with respect to the collar at a controlled rate, which collar can carry a coating suspension, optionally fed from a storage tank.

Figure 3:
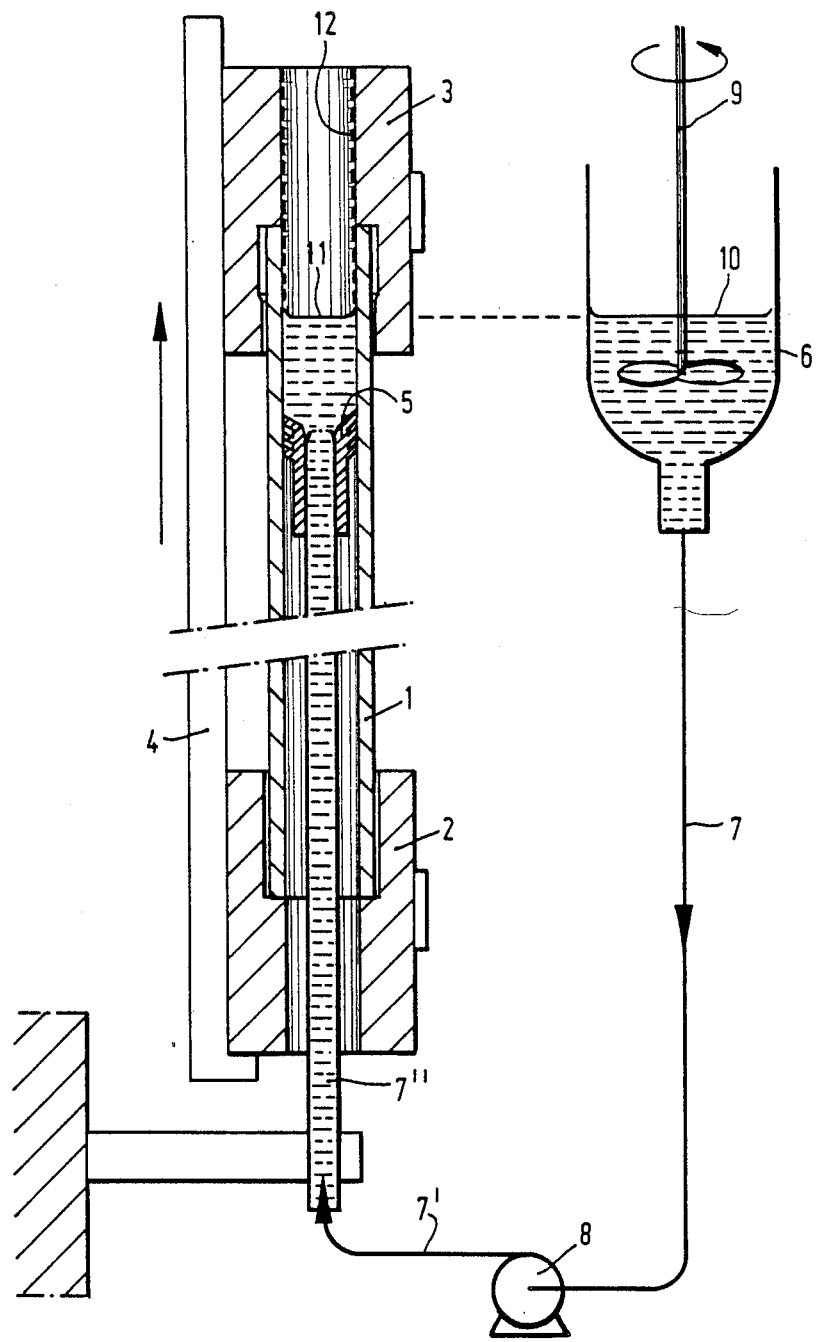
FIG. 3 is a schematic illustration of one embodiment of an apparatus for coating a tubular support with a coating suspension.
Figure 4:
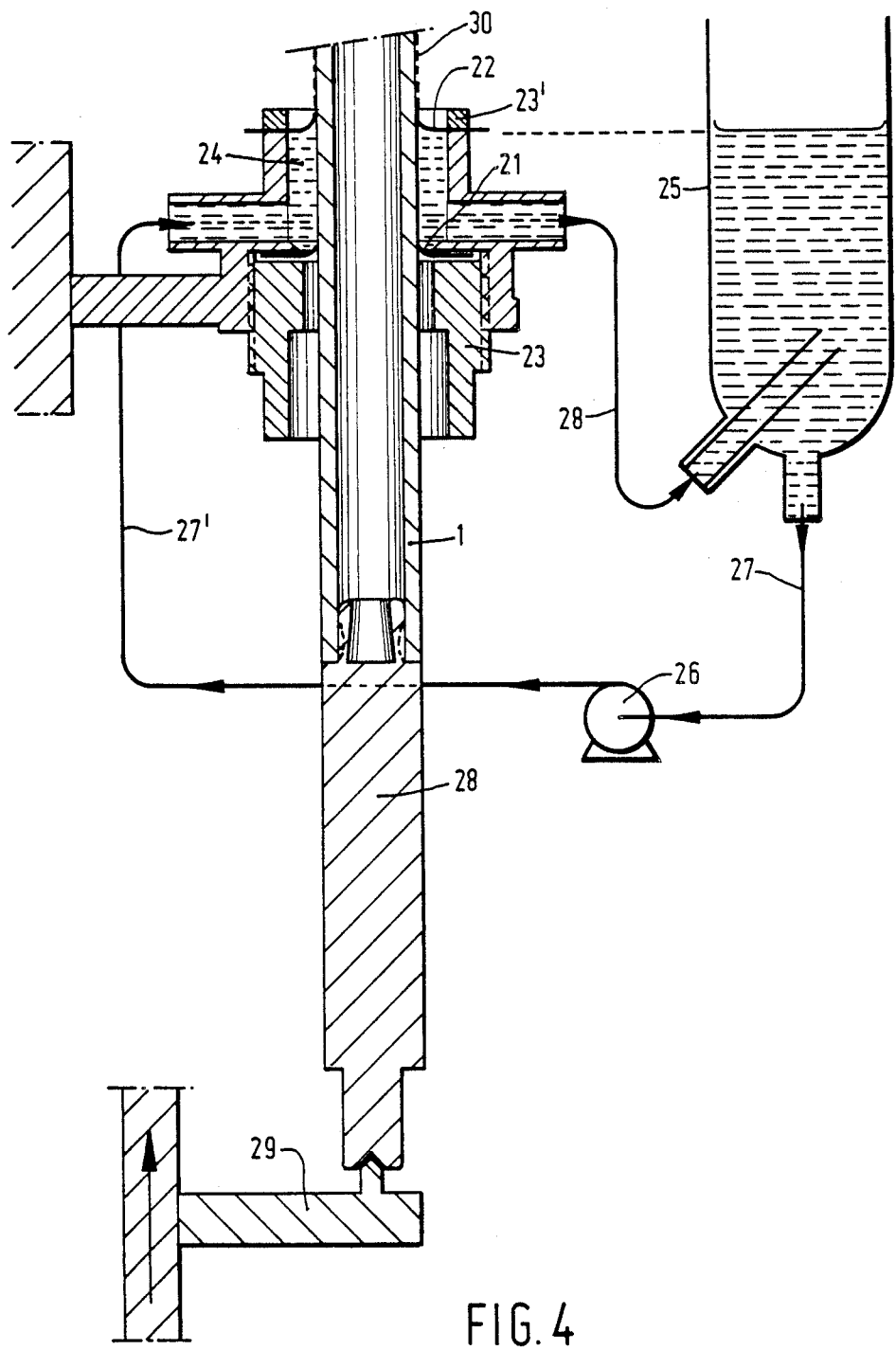
FIG. 4 is a schematic illustration of an alternative embodiment of the apparatus of FIG. 3.

FIGS. 3 and 4 illustrate such apparatus.

FIG. 3 shows an apparatus for internally coating a tubular substrate 1, which substrate is fixed by holders 2 and 3 joined to (a part of) a device 4, which is capable of vertically moving the tube 1 with the holders 2 and 3 at a defined rate.

A sealing collar 5 is located inside the tube 1 against the interior wall. The collar is fixed to the apparatus, i.e. it can move with respect to the tube. The space above collar 5 is connected to a storage tank 6, by conducts 7, 7' and 7" and optionally a pump 8. The storage tank 6 is equipped with a stirring device 9 for keeping the suspension in the tank homogeneous.

Upon moving upward the tubular substrate 1 with the holders 2 and 3, the suspension level 11 is withdrawn downwards along the interior of a tubular substrate 1, and a layer 12 of the coating suspension adheres to the substrate. The thickness of this layer 12 depends on the rate of moving of the substrate with respect to the collar 5. Thus, the entire interior of the tube 1 is coated with a layer 12.

FIG. 4 shows a similar apparatus for externally coating a tubular substrate 1. Two sealing collars 21 and 22, suitably spaced apart, together with fixing means 23 and 23', form a closed space. This space is connected to a suspension containing tank 25, which suspension can be fed through pump 26 and conducts 27, 27' and 28. The tubular substrate 1 is fixed by a support 28' which is joined to a means 29 for vertically moving the tube. Thus, the entire exterior of the tube 1 can be coated with a layer 30.

Figure 5:
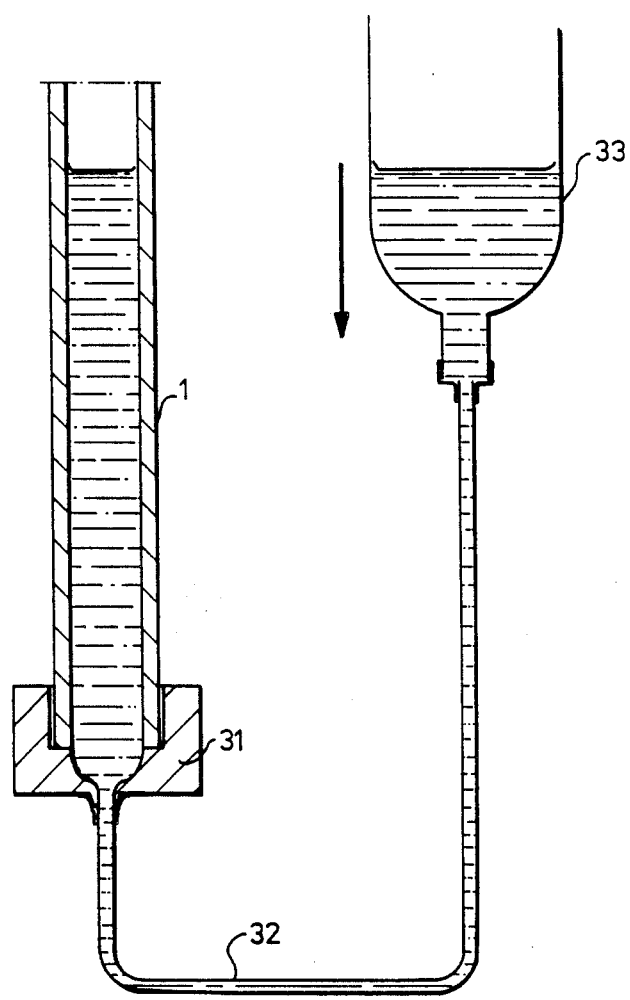
FIG. 5 is a schematic illustration of another alternative embodiment of the apparatus for internally coating a tubular substrate.

FIG. 5 shows another apparatus for internally coating a tubular substrate 1, which is especially useful for coating tubes having small internal diameters. Tube 1 can be held in a fixed position by a support 31 and is connected by a flexible conduct 32 with a vessel 33 containing the coating suspension. The vessel is capable of moving vertically downwards with respect to the tube 1, whereby the coating suspension is withdrawn downwards from the tube at a corresponding rate. Alternatively, the vessel 33 is held in a fixed position and the tube 1 with support 31 can be moved upward.

The invention is further illustrated with the following nonlimiting examples.

EXAMPLE 1

A tube having an external diameter of 20 mm and a wall thickness of 3 mm, consisting of a mixture of sintered alpha alumina and mullite having a pore size range between 0.1 $\mu$m and 5 $\mu$m and an average pore radius of 1 $\mu$m (determined by mercury porosimetry) with large surface pores of up to 50 $\mu$m (observed by electron microscopy), was slowly immersed into a 1% silane solution (Silane PC$_{12}$ from Permacol B.V., Holland) in acetone, for 10 minutes, allowing all pores of the tubular support to be filled with the solution. Then, the tube was taken from the solution and dried in the air at 50° C., until constant weight.

Then, the pretreated and dried tube was vertically coated with a micropermeable layer forming suspension consisting of 100 g Al$_2$O$_3$, grade Alcoa (A16SG), ground to 0.25 $\mu$m particles and dispersed in 140 g of demineralized water, using an apparatus as illustrated in FIG. 3 or FIG. 4. The tube was coated with a withdrawal rate of 5 mm/s. The adhering coating was 20 $\mu$m thick and the porosity after heating at 1200° C. for 2 hours was 38%. No pinholes could be detected in the microfiltration layer by electron microscopy. The permeability of the composite membrane thus produced was 700 1 /h.m$^2$.bar. The average pore radius of the microfiltration layer was 0.06 $\mu$m.

EXAMPLE 2

A tube having an external diameter of 20 mm and a wall thickness of 2.5 mm, consisting of sintered alpha alumina having an average pore radius of 1.5 $\mu$m (determined by mercury porosimetry) with large surface pores of up to 20 $\mu$m (observed by electron microscopy), was slowly immersed into a 1% silane solution (Silane PC$_{12}$ from Permacol B.V., Holland) in acetone, for 10 minutes allowing all pores of the tubular support to be filled with the solution. Then the tube was taken from the solution and dried in the air at 50° C., until constant weight.

Then the pretreated and dried tube was vertically coated with a micropermeable layer forming suspension, consisting of 100 g Al$_2$O$_3$, grade Baikalox CR6, ground and dispersed in 140 g of demineralized water, using an apparatus as illustrated in FIG. 3. The tube was coated with a withdrawal rate of 5 mm/s. The adhering coating was 30 $\mu$m thick and the porosity after heating at 1200° C. for 2 hours was 54%. No pin-holes or microcracks could be detected in the microfiltration layer by electron microscopy. The permeability of the composite membrane thus produced was 8500 1 /h.m$^2$.bar. The average pore radius of the microfiltration layer was 0.12 $\mu$m.

EXAMPLE 3

The two-layer membrane (substrate + microfiltration layer) obtained according to Example 2 was subsequently coated with a boehmite sol using the apparatus of FIG. 3. The boehmite sol (0.7 mol/l) was peptized with nitric acid (molar ratio HNO$_3$/boehmite of 0.1) and contained 1% by weight of glycerol. The coating was then dried under laboratory conditions and sintered at 600° C. during 5 hours. The thickness of the top layer thus obtained was 2 $\mu$m. The layer was smooth and contained no pin-holes or cracks (examined by electron microscopy). The pores of the layer had an average size of about 2 nm with a narrow distribution. Thus, an excellent, three-component ultrafiltration membrane was obtained.

We claim:

1. A two layer microporous membrane consisting of a porous ceramic support having pore sizes between 0.1 $\mu$m and 50 $\mu$m and only one microporous sintered inorganic layer, wherein the microporous layer is bonded directly to the geometric outer surface of the porous support, thereby substantially spanning the pores of the support, with a sharp transition in permeability between the microporous layer and the porous support, the microporous layer having a predetermined average pore diameter between 20 nm and 1 $\mu$m, and being essentially free of pin-holes.

2. The membrane of claim 1, characterized by a thickness of the microporous layer of 10–100 $\mu$m, preferably 15–30 $\mu$m.

3. The membrane of claim 1, characterized by an average pore diameter of the microporous layer of 100–500 nm.

4. The membrane of claim 1, characterized in that the microporous layer consists essentially of a metal oxide.

5. The membrane of claim 4, characterized in that the metal oxide is alumina.

6. The membrane of claim 1, characterized in that the porous support consists essentially of alpha alumina.

* * * * *